United States Patent [19]

Hall

[11] Patent Number: 5,317,336

[45] Date of Patent: May 31, 1994

[54] MOUSE YOKE ASSEMBLY FOR INTERFACING WITH A COMPUTER

[76] Inventor: Kenneth J. Hall, 7554 Weld County Rd. 74, Windsor, Colo. 80550

[21] Appl. No.: 902,966

[22] Filed: Jun. 23, 1992

[51] Int. Cl.⁵ .............................................. G09G 5/08
[52] U.S. Cl. .................................. 345/164; 248/918; 273/148 B
[58] Field of Search ...................... 340/710, 706, 709; 248/918, 231.7, 231.8, 229; 269/97, 98, 130, 131; 273/148 B; 345/164, 156, 157

[56] References Cited

U.S. PATENT DOCUMENTS

| | | | |
|---|---|---|---|
| 2,660,079 | 11/1953 | Bellows | 269/97 |
| 3,854,712 | 12/1974 | McGee | 269/97 |
| 4,659,313 | 4/1987 | Kuster et al. | 434/45 |
| 4,788,537 | 11/1988 | Potiker | 273/148 B |
| 4,824,084 | 4/1989 | Tzong-lin | 269/97 |
| 5,119,742 | 6/1992 | Simmie | 248/214 |

Primary Examiner—Richard Hjerpe
Assistant Examiner—Lun-Yi Lao
Attorney, Agent, or Firm—Reising, Ethington, Barnard, Perry, & Milton

[57] ABSTRACT

A mouse yoke assembly for interfacing with a computer through the sensing mechanism of a mouse including a housing and a control member movably supported by the housing. The housing is adapted to support a mouse thereon and relative to the control member such that movement of the control member is sensed by the sensing mechanism of the mouse. The assembly includes a clamp member for removably mounting the housing to a support structure to immobilize the housing as the control member is moved relative to the housing.

8 Claims, 3 Drawing Sheets

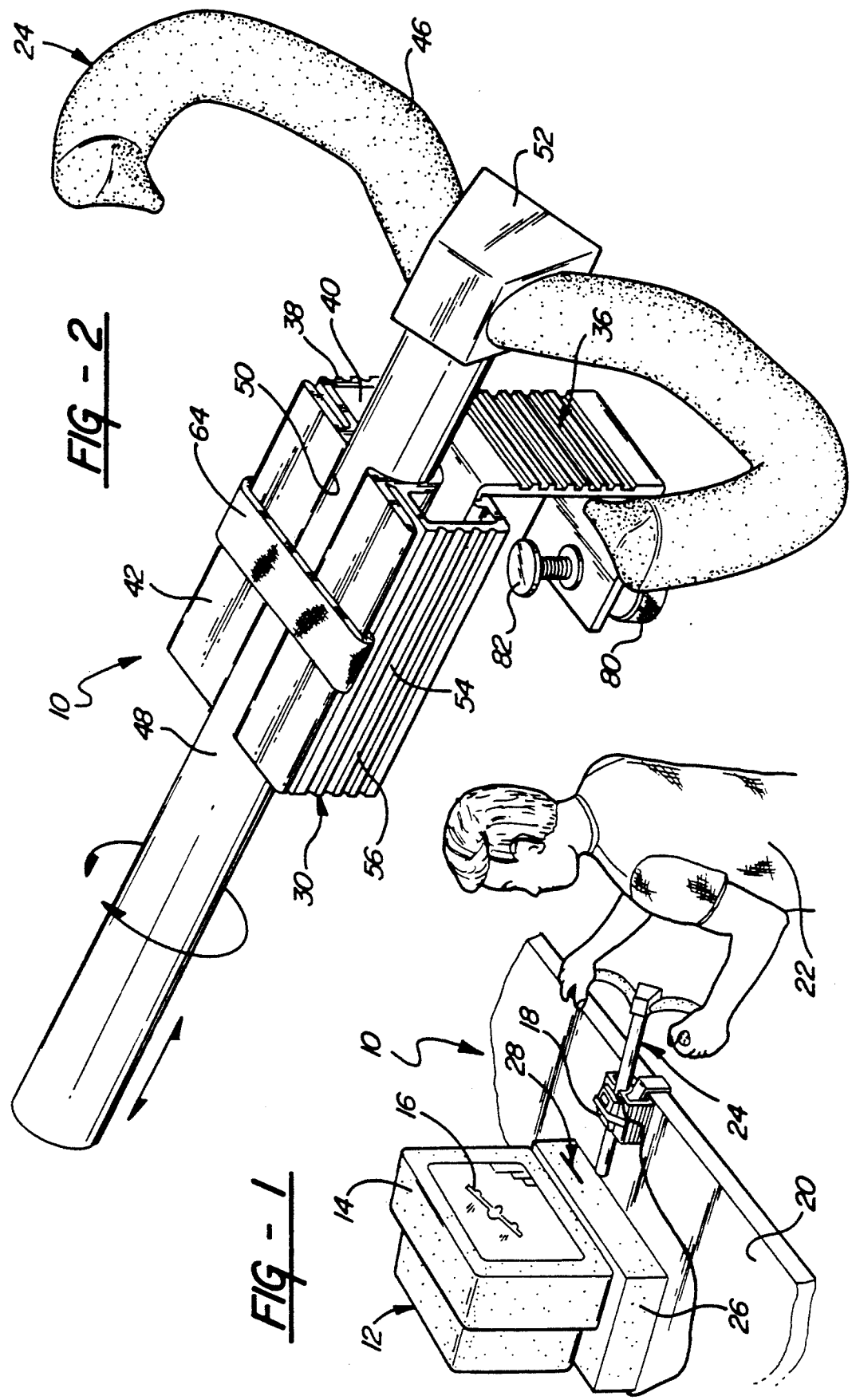

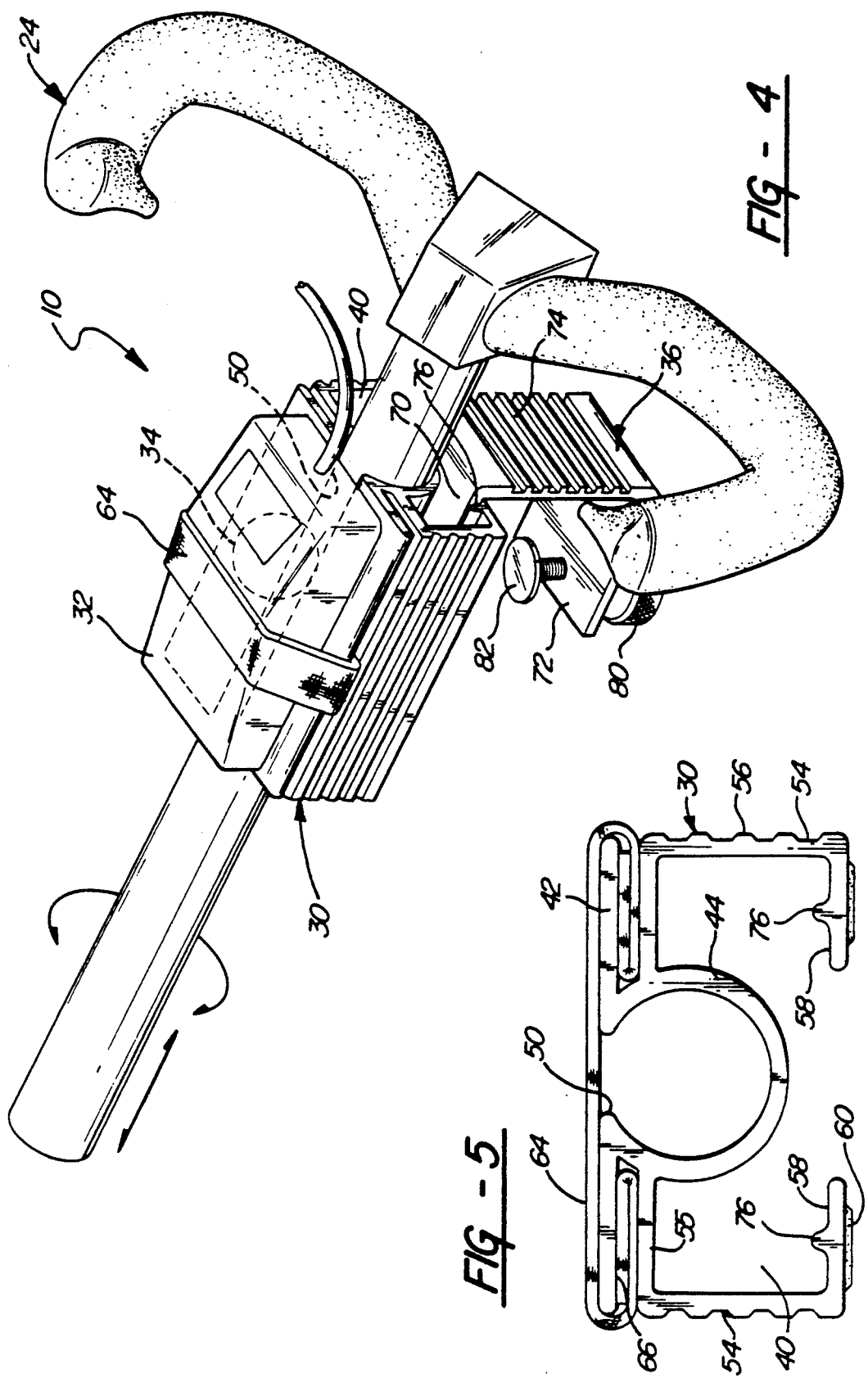

MOUSE YOKE ASSEMBLY FOR INTERFACING WITH A COMPUTER

BACKGROUND OF THE INVENTION (1) Technical Field

The subject invention is directed toward a mouse yoke assembly for interfacing with a computer through the sensing means of a mouse to simulate to the operator of the assembly the sensation of flying a plane, driving a car, etc. as dictated by the software running on the computer.

(2) Description of the Prior Art

As the number of people who own or have access to a personal computer increases, so does the demand for sophisticated software. This demand has resulted in a wide range of utilitarian products such as accounting, tax and personal finance software as well as sophisticated software designed to entertain and teach. The programs designed to simulate flying an aircraft or driving a car are examples of this type of software which produces a realistic representation of the flying or driving experience on the computer monitor and which responds to user input to simulate the feeling of actual flight or driving.

While the software which runs on the personal computer is sophisticated, the means by which the operator interfaces with the software is not. Generally, the operator of such simulation software must employ a joystick to maneuver the aircraft or vehicle in conjunction with the computer keyboard which controls the throttle. Additionally, it is not uncommon that an operator must rely solely on the keyboard to interface with the simulation software. Unfortunately, neither the joystick nor the keyboard are adequate substitutes for the flight controls of an aircraft or steering wheel of a vehicle and do not give the operator the feeling that they are actually flying a plane or driving a vehicle and therefore take away from the overall experience and fun of the simulation software.

There are other means known in the art for interfacing with simulation software and which give the operator a more realistic experience. For example, U.S. Pat. No. 4,659,313 issued to Kuster et al. on Apr. 21, 1987 discloses a control yoke apparatus for computerized air craft simulation having a steering wheel mounted to a shaft which terminates in an L-shaped crank mechanism. The crank mechanism is attached to a standard joystick via a piece of resilient elastic rubber-like material. The crank mechanism transforms rotation of the wheel into rotation of the joystick to thereby maneuver the aircraft simulated on the computer monitor. The control yoke may also be used in connection with another joystick which controls the throttle of the simulated aircraft.

Although the Kuster et al. control yoke better approximates aircraft flight control, it is deficient in that it is relatively mechanically complex and requires the use of at least one X-Y two axis variable transducer in the form of a joystick mounted within the housing of the apparatus. Therefore, while an improvement over the prior art, the Kuster et al control yoke is still relatively expensive and, to my knowledge, not commercially available.

One of the accessories commonly used with personal computers today is a mouse. The mouse is a small, hand held device which can control the movement of a curser or other image on the computer monitor through an X-Y, two axis transducer which, in turn, responds to the movement of a track ball of the mouse. The mouse can be used to interface with simulation software and U.S. Pat. No. 4,788,537 issued to Potiker on Nov. 29, 1988 takes advantage of this capability. The Potiker '537 patent discloses a mouse interface assembly which is adapted to simulate aircraft or vehicle controls and to interface with simulation software through the mouse. The Potiker '537 interface assembly includes a rectangular enclosure which forms a base on which the mouse is mounted and which houses a first member having an enlarged cylindrical member which defines an enlarged peripheral surface. Movement of the cylindrical member and thus its peripheral surface actuates the track ball of the mouse. The first member, its enlarged cylindrical member and therefor the enlarged peripherical surface is manipulated through a second member which extends out of the enclosure and on which is mounted a control wheel. The second member is manually actuable by the operator to bring about simulated aircraft or vehicle maneuvers through the mouse as dictated by the software running on the computer.

However, and as with the Kuster et al. control yoke, the Potiker '537 mouse interface assembly is deficient in that it is relatively complex. The enlarged cylindrical member of the first member must be housed in an enclosure of sufficient magnitude to accommodate the cylindrical member and thus creates cost barriers from a manufacturing standpoint. In addition, the Potiker '537 patent does not disclose a means for mounting the base to a support surface such as a desk top. Accordingly, the Potiker interface assembly is susceptible to sliding or otherwise inadvertent movement on the desk top in response to movement of the control wheel.

SUMMARY OF THE INVENTION AND ADVANTAGES

The subject invention overcomes the problems in the prior art in a mouse yoke assembly for interfacing with a computer which is affordable, elegantly simple and which is mountable to a support structure to prevent inadvertent movement of the assembly during use. More specifically, the subject invention is directed toward a mouse yoke assembly for interfacing with a computer through the sensing means of a mouse including a control member and a housing defining a central channel extending therethrough. The housing includes a platform surface for supporting a mouse and an upwardly opening, arcuately shaped cradle portion disposed within the channel and adjacent the platform surface. The control member is movably supported by the cradle portion adjacent the platform surface such that movement of the control member is sensed by the sensing means of the mouse. The assembly further includes a clamping means for removably mounting the housing to a support structure and to immobilize the housing as the control member is moved relative to the housing.

In this way, the subject invention overcomes the problems associated in the prior art by providing a mechanically efficient, affordable mouse yoke which can be mounted to a support structure and immobilized while in use.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of the yoke assembly of the subject invention as it would be employed by an operator to interface with a computer through a mouse;

FIG. 2 is a perspective view of the mouse yoke assembly of the subject invention;

FIG. 4 is a perspective view of the yoke assembly of the subject invention showing a mouse mounted thereon;

FIG. 5 is a cross-sectional side view of the yoke assembly's housing; and

DETAILED DESCRIPTION OF THE BEST MODE OF CARRYING OUT THE INVENTION

Figure 3:
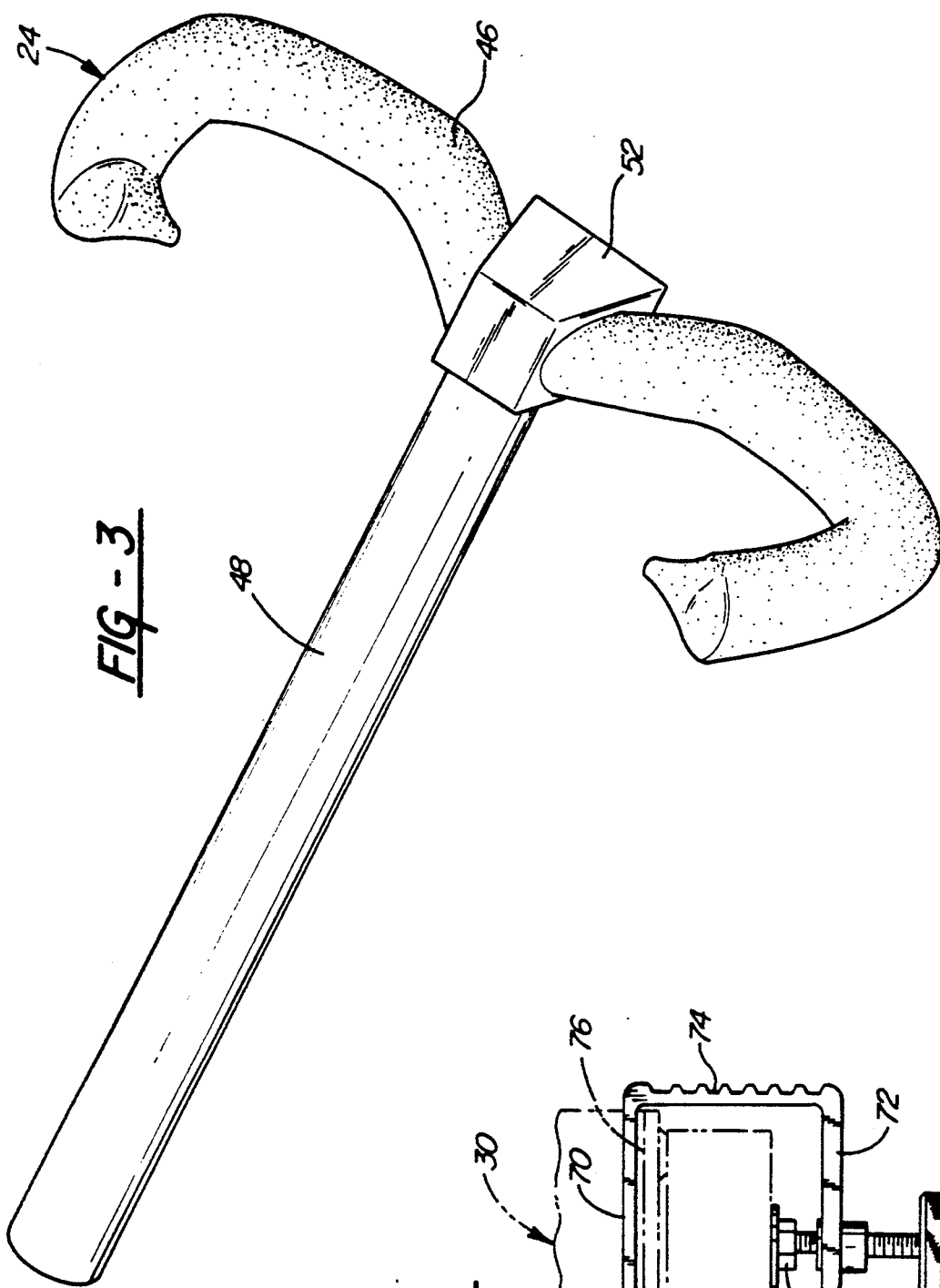
FIG. 3 is a perspective view of the control member of the subject invention.

A mouse yoke assembly for interfacing with a computer through the sensing means of a mouse is generally shown at 10 in FIGS. 1, 2 and 4. The mouse yoke 10 is designed to better simulate to the operator of the yoke the sensation of flying a plane, driving a vehicle, etc. as dictated by the software running on the computer. To that end, a computer, generally indicated at 12, having a monitor 14 on which is displayed in aircraft 16 engaged in a left banking maneuver is shown in FIG. 1. A mouse, generally indicated at 18, is mounted on the yoke assembly 10 which, in turn, is mounted to a support structure such as a desk top 20. An operator 22 is actuating a control member, generally indicated at 24, the movement of which is sensed by the sensing means of the mouse 18 which, in turn, controls the maneuver of the aircraft 16 depicted on the monitor 14 as dictated by the aircraft simulation software. The computer 12 includes an electronic cabinet 26 which houses the central processing unit, hard drive, disk drive, etc. as is commonly known in the art. As depicted in FIG. 1, a disk including the aircraft simulation software has been loaded on the computer 12 via the disk drive as generally indicated at 28. The actual type of software is irrelevant and may include driving simulation software or any other software which would be enhanced by the use of the yoke assembly 10 of the subject invention.

Referring now to FIG. 4, the yoke assembly 10 includes a housing, generally indicated at 30, which movably supports the control member 24 and which is adapted to support a mouse 32 relative to the control member 24 such that movement of the control member 24 is sensed by the sensing means of the mouse 32. Typically, the sensing means of the mouse will include an X-Y, two axis transducer which is sensitive to the movement of a track ball 34, which, in this case, is in rolling contact with the control member 24 as will be discussed in greater detail below.

The yoke assembly further includes a clamping means, generally indicated at 36, for removably mounting the housing 30 to the support structure 20 and for immobilizing the housing 30 as the control member 24 is moved relative to the housing 30.

Referring now to FIGS. 2 and 5, the housing 30 includes an integral, extruded aluminum, hollow body 38 defining a central channel 40 extending therethrough and a platform surface 42 upon which the mouse 32 is supported. An upwardly opening, arcuately shaped, cradle portion 44 is disposed adjacent the platform surface 42 and extends through the channel 40. The housing 30 is made of a 6063 TO5 aluminum alloy which may be manufactured using standard extrusion technology commonly known in the art.

The control member 24 includes a handle portion 46 and an elongated plastic cylindrical shaft 48 extending therefrom which is adapted to be movably supported by the cradle portion 44 such that movement of the shaft 48 is sensed by the sensing means of the mouse 32. To this end, the platform surface 42 includes an elongated slot 50 extending substantially parallel to the axis of the shaft 48 and the full length of the platform surface 42. The elongated slot 50 provides sensing communication between the shaft 48 of the control member 24 and the sensing means of the mouse. More specifically, if the mouse employs a track ball 34 as shown in phantom in FIG. 4, it will rest between the edges of the platform 42 which defines the slot 50 and in rolling contact with the shaft 48 of the control member. When the control member is actuated, the shaft 48 will move either rotatably or rectilinearly within the cradle portion 44. This shaft movement imparts movement to the track ball 34 in either the X or Y axis. The track balls movement is sensed by a transducer and is relayed to the computer which interprets the movement, through the simulation software, and presents the appropriate response on the monitor 14. Alternatively, the sensing means of the mouse may be any other means such as an optical sensor.

The handle portion 46 depicted in the figures is shown in the style of an aircraft yoke but it is to be understood that the handle portion 46 could also be in the style of an automotive steering wheel or any other structure which may be chosen depending upon the type of simulation software running on the computer. In any event, the handle portion 46 includes a hub 52 which is attached or otherwise removably mounted to the cylindrical shaft 48. In this way different styles of handle portions 46 may be interchangeably used with the shaft 48. The handle portion 46 is manufactured using standard injection molding technology and ABS Plastic as commonly known in the art. The shaft 48, on the other hand, is make of extruded polyvinylchloride Plastic using standard extrusion technology as is commonly know in the art.

The housing 30 further includes a pair of sidewalls 54 extending downwardly from a ceiling portion 55 and having a plurality of longitudinally extending parallel ribs 56 disposed on the outwardly facing surface of the sidewalls 54. As is best shown in FIG. 5, the sidewalls 54 terminate in a pair of inwardly extending base portions 58 disposed spaced from and generally parallel to the ceiling 55. The base portion 58 forms the bottom of the housing 30. Altogether, the ceiling portion 55, sidewalls 54 and base portions 58 of the housing define the central channel 40. Four rubber tabs 60 are employed on the underside of the base portions 58 to help the housing better grip a support structure such as a desk top.

In order to firmly mount the mouse 32 to the platform surface 42, the assembly also includes an elastomeric strap 64 which is anchored at either end in a recess 66 formed by the gap between the platform surface 42 and the top of the ceiling 55 of the housing 30. The strap 64 easily extends over the outer surface of the mouse 32 to firmly hold it in place.

Figure 6:
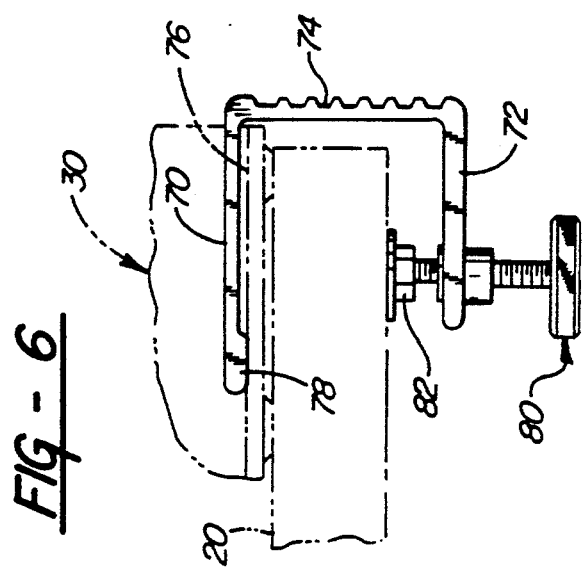
FIG. 6 is a cross-sectional side view of the clamping means of the subject invention as disposed in its operative environment.

Referring now to FIGS. 4, 5 and 6, the clamping means 36 used to removably mount the housing 30 to a support structure 20 includes an extruded aluminum, U-shaped member having a pair of legs 70, 72 and a connecting portion 74 extending therebetween. The upper leg 70 as depicted in FIG. 6 is longer than the other leg 72 and extends into the channel 40 of the housing 30 between a pair of longitudinally extending parallel ribs 76 disposed on either base portion 58 of the housing 30. The upper leg 70 further includes a downwardly extending transverse rib 78 which helps to grip the base portion 58 and therefore the housing 30. The lower leg 72 as shown in FIG. 6 is disposed adjacent to the underside of the desk top 20 such that the desk top 20 is located between the upper 70 and lower 72 legs of the U-shaped member 36. The U-shaped member 36 is made of a 6063 TO5 aluminum alloy which may be manufactured using standard extrusion technology as commonly known in the art.

A fastening means in the form of a threaded screw 80 is employed for fixing the U-shaped clamping member relative to the desk top 20 or other support structure to immobilize the housing 30 relative to the support structure. The screw 80 includes a washer 82 or other buffer type structure disposed at its distal end to prevent the screw 80 from leaving permanent indentations or other marks on the support structure.

In this way, the subject invention provides an inexpensive mouse yoke assembly 10 which may be clamped to any support structure conveniently located near a computer adapted to run simulation software. A mouse 30 having a sensing means can be quickly mounted to the platform surface 42 and held in place with a strap 64. An operator is then ready to manipulate the control member 24 to cause rotational or rectilinear movement of the shaft 48 in the cradle portion 44 which is then sensed by the mouse sensing means to interface with the simulation software running on the computer.

The invention has been described in an illustrative manner and it is to be understood that the terminology which has been used is intended t be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What I claim is:

1. A mouse yoke assembly for interfacing with a computer through the sensing means of a mouse, said assembly comprising;
    a housing and a control member movably supported by said housing, said housing including an integral body defining a central channel extending therethrough, and a cradle portion supporting a shaft of the control member along a single continuous length of the shaft, said housing adapted to support a mouse thereon and relative to said control member such that movement of said control member is sensed by the sensing means of the mouse;
    said assembly including a clamping means for removably mounting said housing to a support structure and to immobilize said housing as said control member is moved relative to said housing;
    said clamping means including a U shaped member having a pair of legs and a connecting portion extending therebetween with one of said legs extending into said channel of said housing and the other disposed adjacent a support structure such that the support structure is disposed therebetween and a fastening means for fixing the U shaped member relative to the support structure to immobilize said housing relative to the support structure.

2. An assembly as set forth in claim 1 further characterized by said housing including a platform surface and an upwardly opening arcuately shaped cradle portion extending through said channel and adjacent said platform surface, said control member including a handle portion and an elongated cylindrical shaft extending therefrom which is adapted to be movably supported by said cradle portion such that movement of said shaft is sensed by the sensing means of the mouse.

3. An assembly as set forth in claim 2 further characterized by said platform surface including an elongated slot providing sensing communication between the shaft of said control member and the sensing means of the mouse.

4. A mouse yoke assembly for interfacing with a computer through the sensing means of a mouse, said assembly comprising;
    a control member and a housing defining a central channel extending therethrough such that said channel of said housing is open ended at at least one end thereof, said housing including a platform surface for supporting a mouse and an arcuately shaped cradle portion disposed within said channel, said cradle portion opening upward relative to said platform surface and;
    said control member movably supported by said cradle portion adjacent said platform surface such that movement of said control member is sensed by the sensing means of the mouse through the upward opening of the cradle portion.

5. An assembly as set forth in claim 4 further characterized by said platform member including an elongated slot providing sensing communication between said shaft of said control member and the sensing means of the mouse.

6. An assembly as set forth in claim 5 further characterized by including a clamping means for removably mounting said housing to a support structure and to immobilize said housing as said control member is moved relative to said housing.

7. An assembly as set forth in claim 6 further characterized by said clamping means including a U-shaped member having a pair of legs and a connecting portion extending therebetween with one of said legs extending into said central channel of said housing and the other of said legs disposed adjacent a support structure so that the support structure is disposed therebetween and a fastening means for fixing the U-shaped member relative to the support structure thereby immoblizing said housing.

8. A mouse yoke assembly for interfacing with a computer through the sensing means of a mouse, said assembly comprising;
    a control member and a housing defining a central channel extending therethrough, said housing including a platform surface for supporting a mouse and an arcuately shaped cradle portion disposed within said channel, said cradle portion opening upward relative to said platform surface and, said control member movably supported by said cradle portion adjacent said platform surface such that movement of said control member is sensed by the sensing means of the mouse through the upward opening of the cradle portion; and
    clamping means for removably mounting said housing to a support structure and to immobilize said housing as said control member is moved relative to said housing.

* * * * *